United States Patent

Blanshine et al.

[15] 3,670,482
[45] June 20, 1972

[54] TWO ROW ROW CROP ATTACHMENT WITH LOWER CROP GATHERING MEANS AT THE CENTER THAN AT THE SIDES

[72] Inventors: Allison W. Blanshine, R.D. 03, Lititz, Pa. 17553; Richard A. Pucher, 57 Melvin Drive, Leola, Pa. 17540

[22] Filed: Aug. 17, 1970

[21] Appl. No.: 64,432

[52] U.S. Cl. ..................................................56/98
[51] Int. Cl. ..................................................A01d 45/02
[58] Field of Search ..............................56/94–100, 105–112

[56] References Cited

UNITED STATES PATENTS

| | | | |
|---|---|---|---|
| 3,352,093 | 11/1967 | Procter | 56/98 |
| 3,375,646 | 4/1968 | Dion | 56/98 |
| 2,681,541 | 6/1954 | Richey et al. | 56/111 |
| 3,439,479 | 4/1969 | Zitko et al. | 56/98 |
| 3,400,524 | 9/1968 | Segredo | 56/98 |

*Primary Examiner*—Louis G. Mancene
*Assistant Examiner*—J. A. Oliff
*Attorney*—Joseph A. Brown, John C. Thompson, James J. Kennedy and George C. Bower

[57] ABSTRACT

The top center crop gathering chains and lugs are lower at the rear than the respective top side crop gathering chains and lugs and the top fender of the center is lower than the top fenders of the sides to cause the cut stalk crops to tilt inwardly. The rear center plate is tilted downwardly to horizontally feed the inwardly tilted crops for a smoother operation of the attachment.

5 Claims, 9 Drawing Figures

INVENTOR.
ALLISON W. BLANSHINE
RICHARD A. PUCHER
BY George C. Bower
ATTORNEY

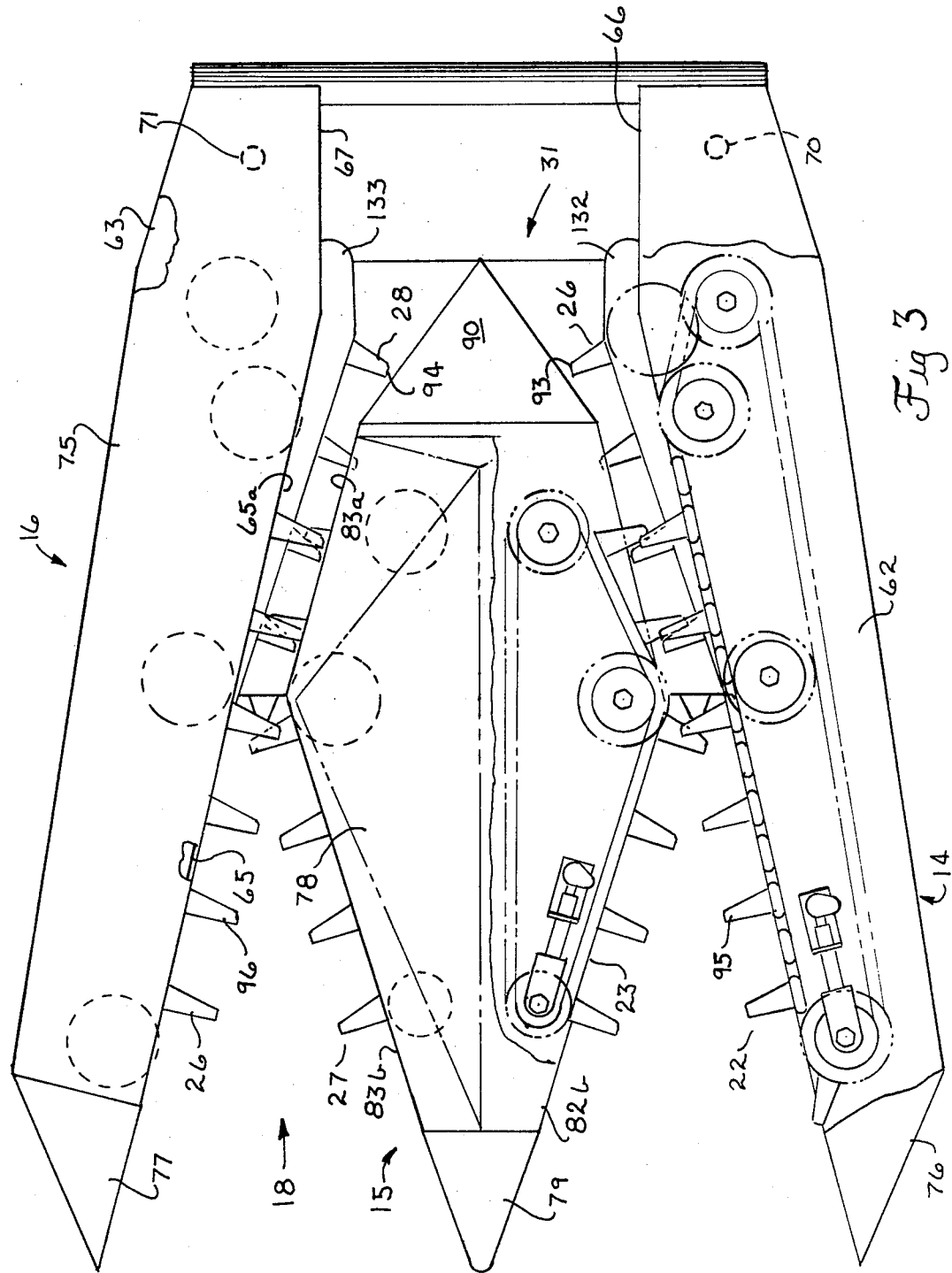

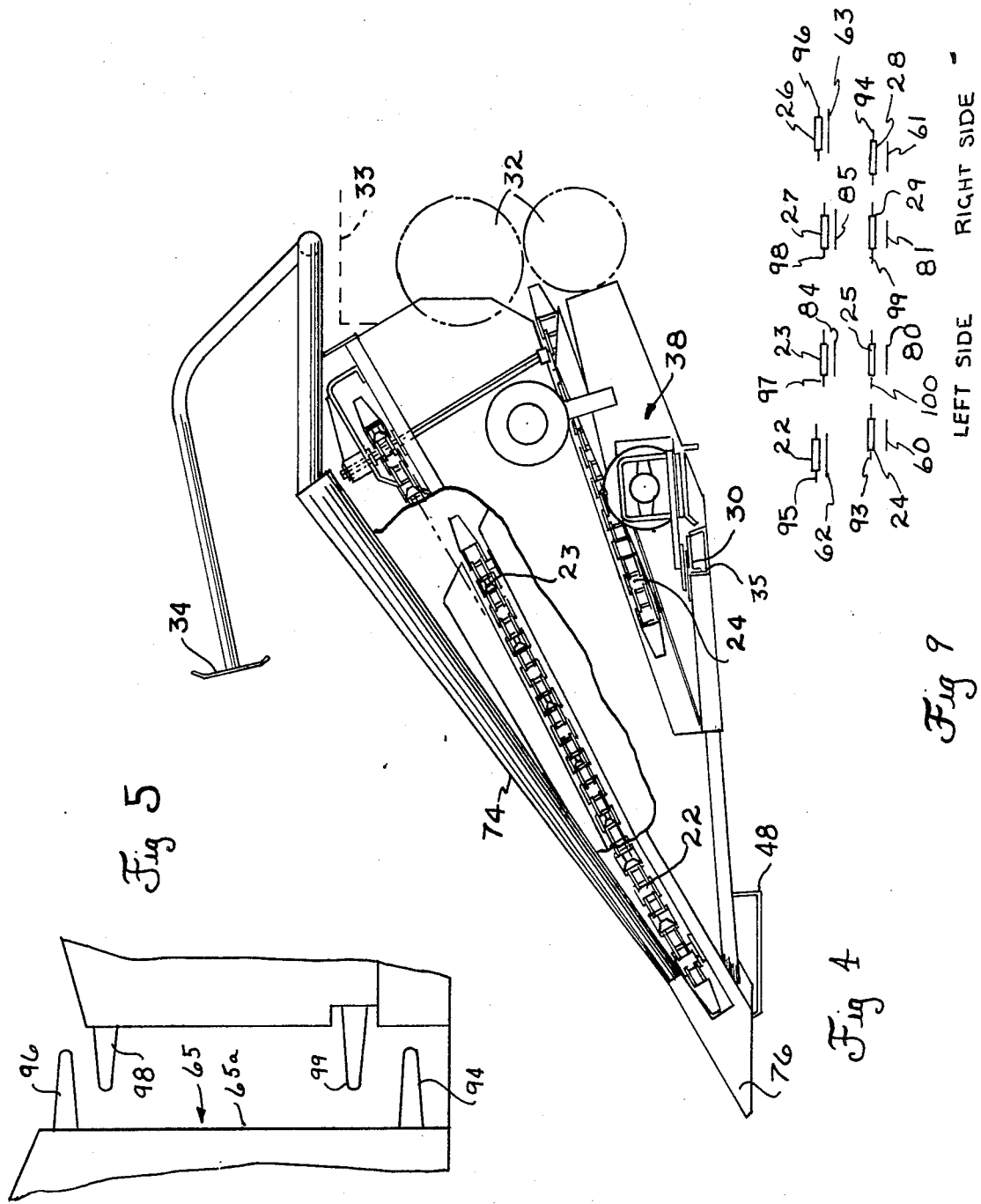

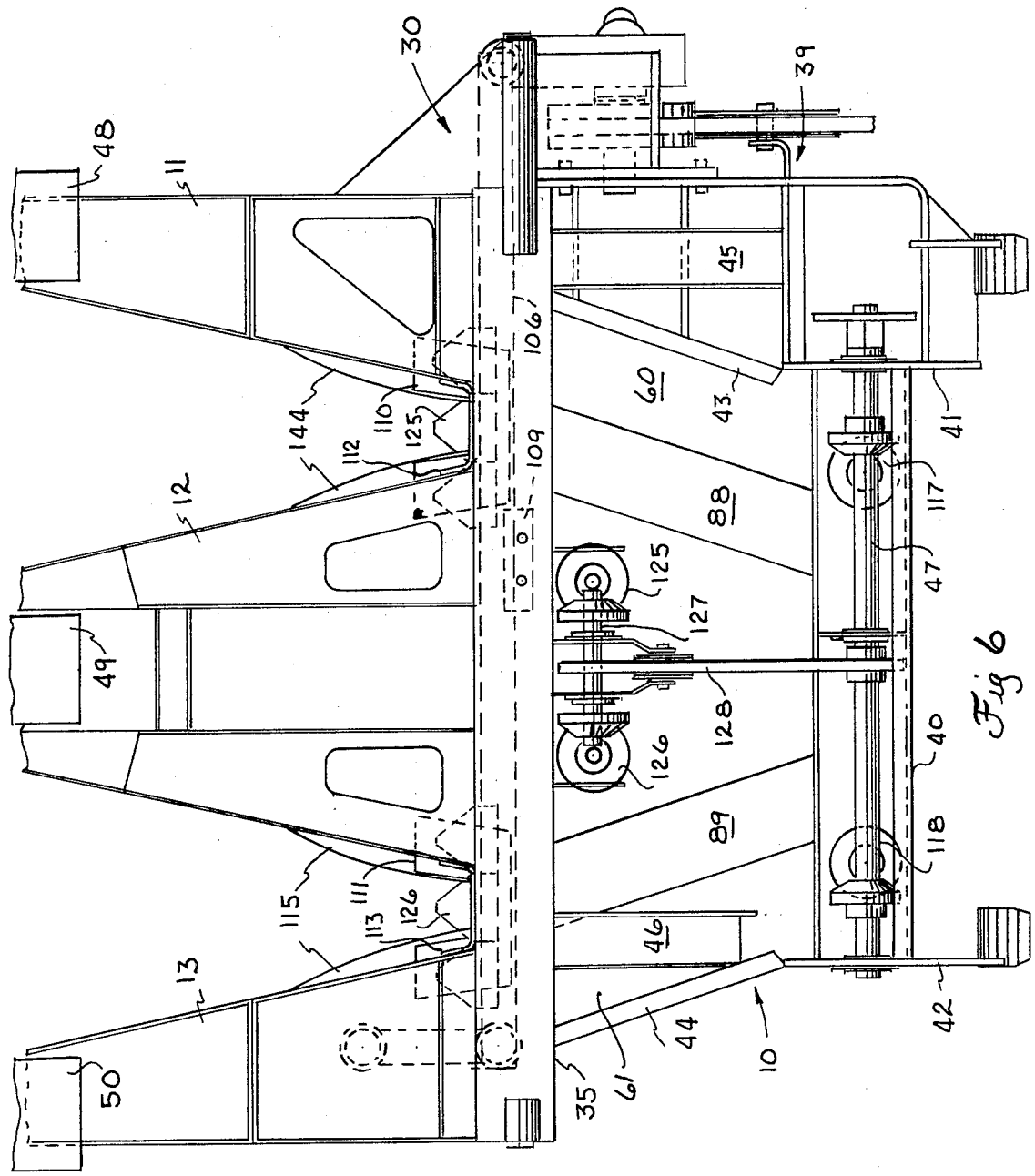

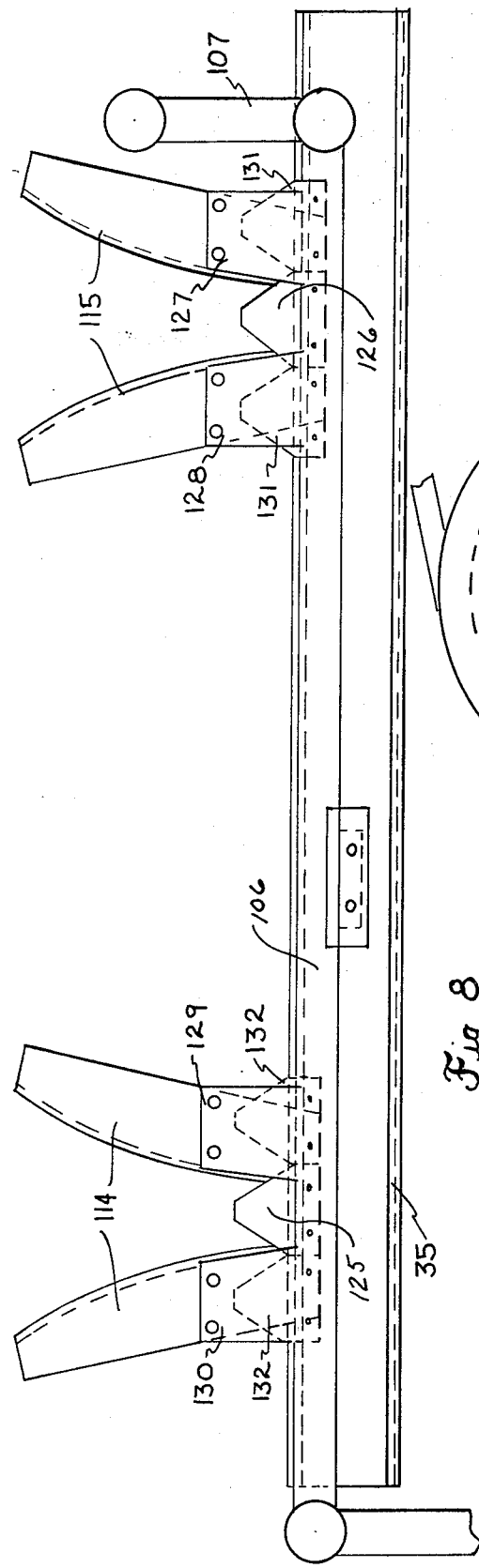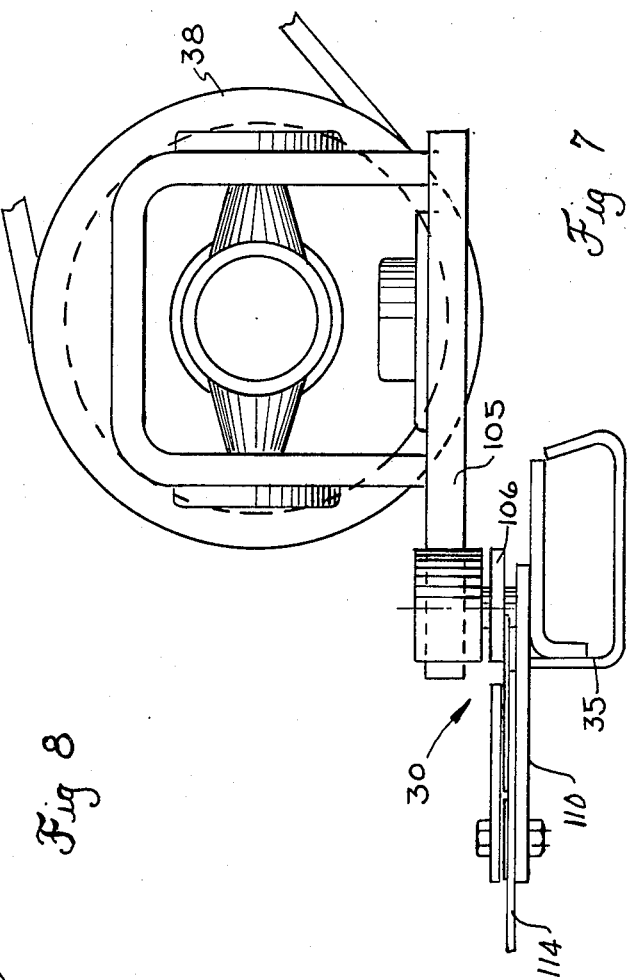

3,670,482

TWO ROW CROP ATTACHMENT WITH LOWER CROP GATHERING MEANS AT THE CENTER THAN AT THE SIDES

BACKGROUND OF THE INVENTION

This invention relates to row crop attachments and is directed particularly to the relationship of the upper crop gathering means on a two row row crop attachment.

In previous two row row crop attachments the center frame and the top gathering chains with lugs were at the same level as the respective top gathering chains and lugs on the side frames. The lugs intermeshed to carry the crop up the stalkway to the discharge. The cut crops were held generally vertical resulting in the separate feeding of the crops to the rolls of a forage harvester. With the lugs of the gathering chains having to intermesh it is necessary to maintain the chains in timed relation. As the linkages of the chains become worn the chains lengthen resulting in the lugs shifting out of timed relation. The adjustment of the centers of the sprockets carrying the chains removes the slack but may not reestablish a timed relation since the wear is distributed throughout the length of the chains. Thus with usage the chains have to be replaced and reset for timed operation. Another disadvantage of the present two row row crop attachment is the need for a better orientation of the stalk crops at the discharge of the two row row crop attachment.

The stalks of crops should preferably be out of the way of the following stalks to lessen the interference between the stalks. Since the bite of the feed rolls is horizontal and extends across the discharge of the row crop attachment, the stalks should be generally horizontal and evenly distributed across the discharge.

It is therefore the purpose of this invention to provide a smooth and more even feed of crops to a forage harvester and the elimination of the necessity of the center crop gathering lugs being in meshed timed relation with the respective side crop gathering lugs.

OBJECTS AND SUMMARY OF THE INVENTION

An object of this invention is to provide a two row row crop attachment with a smooth and even feeding of crops to the discharge.

Another object of the invention is on a two row row crop attachment to consolidate the stalk crops towards the center of the attachment and horizontally position the crops at the discharge for a smooth and even feed of the stalk crops.

Another object of the invention is to provide a two row row crop attachment in which the top center and side crop gathering means with lugs are in non-meshing relation.

In this invention the center frame and crop gatherers of a two row row crop attachment are lower than the side frame and crop gatherers and the rear panel of the center frame is low for a large area at the discharge to provide a smooth and even feed of stalk crops to the reel.

Other and further objects and advantages of this invention will be apparent from the following specification and appended claims taken in connection with the drawings which illustrate the various features of this invention.

BRIEF DESCRIPTION OF THE DRAWINGS

FIG. 3 is a top view.
FIG. 4 is a side view.
FIG. 5 is a fragmentary rearward view of the narrow portion of the right stalkway to illustrate the relation of the crop gathering lugs.
FIG. 6 is a bottom view of the two row row crop attachment.
FIG. 7 is an enlarged view of the stringer bar, sickle and sickle drive.
FIG. 8 is a top view of the sickle and stringer bar.
FIG. 9 is a forward diagrammatic view of the crop gathering means.

DETAILED DESCRIPTION OF THE PREFERRED EMBODIMENT OF THE INVENTION

Introduction

Figure 1:
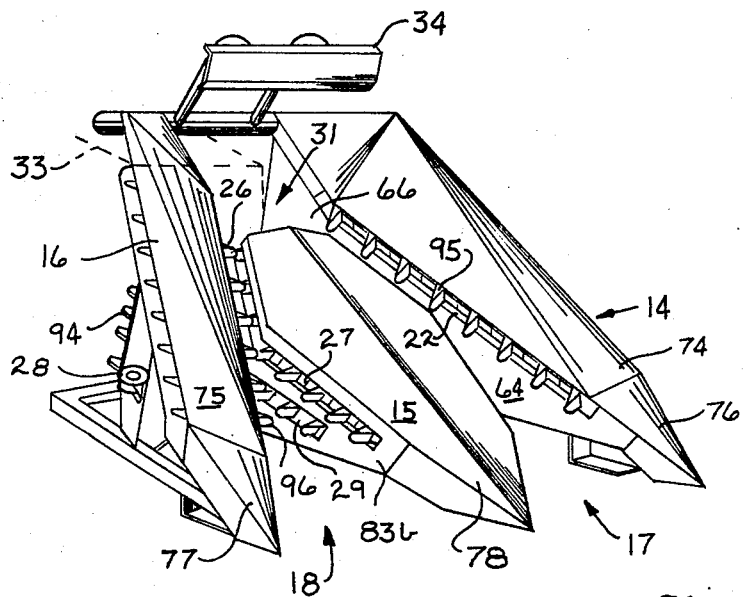
FIG. 1 is a front perspective view of the two row crop attachment.
Figure 2:
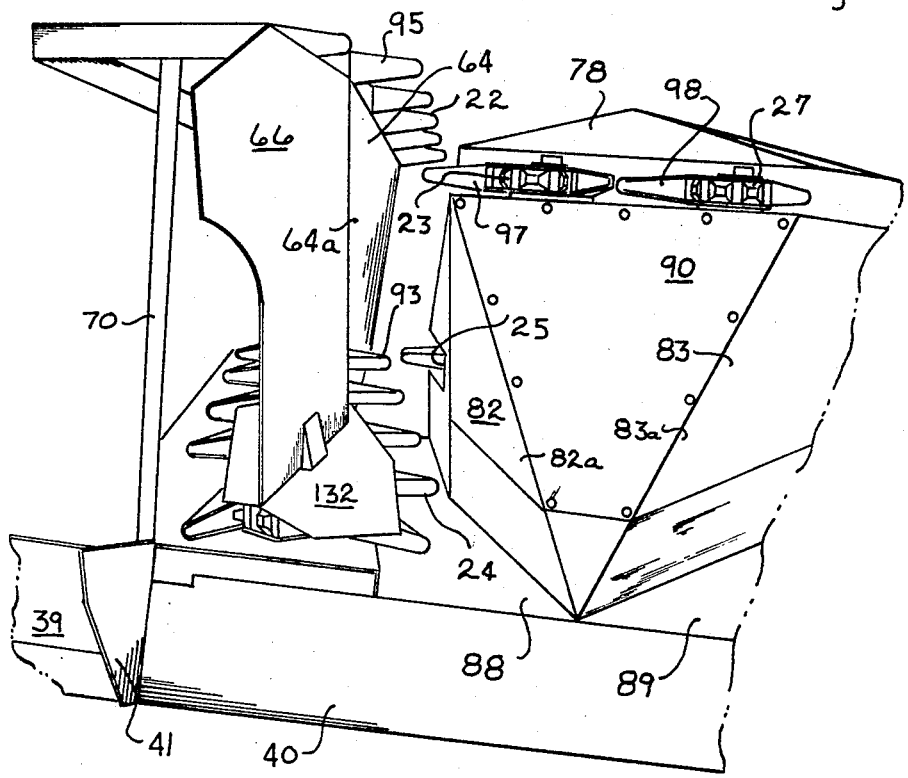
FIG. 2 is a partial rear perspective view.

The two row row attachment shown in FIGS. 1 – 6 has a rear base frame 10 and lower and upper center and side frames 11, 12, 13 and 14, 15 and 16, respectively. The center and side frames form crop passages or stalkways 17 and 18. The left side frame and the left side of the center frame have upper crop gathering means 22, 23 and lower crop gathering means 24, 25. The upper right side frame and the upper right side of the center frame have crop gathering means 26 and 27, respectively, and lower crop gathering means 28 and 29, respectively. The crop gathering means draw crops into and up the stalkways 17 and 18 against the cutting means or sickle 30 and carry the crop rearwardly to the discharge 31 for delivery of the cut crops to the feed rolls 32 of a forage harvester 33. A crop bumper 34 is mounted on the rear of the side frames and extends forwardly over the stalkways to prevent stalks from falling over the rear of the row crop attachment.

The lower frames 11, 12 and 13 are welded to a stringer bar 35 (FIG. 6) which is in turn welded to the front of the base frame 10. The stringer bar is stiff to bending and torsional forces. The sickle or cutting means is mounted on this bar and associated lower frames.

Base and Lower Frames with Stringer Bar

The base frame 10 has a rear L-shaped transverse beam 40 with longitudinally extending plates 41, 42 attached to the left and right ends of the beam respectively. The plates are connected to the transverse stringer bar 35 by the forwardly diverging plate members 43, 44 firmly secured between the plates 41, 42 and the stringer bar. To the left of the plate member 43 is the support structure 39 for the wobble drive 38. Generally L-shaped pieces 45 and 46 are welded to the rear edge of the stringer bar. The left piece 45 is fastened at its rear end to the wobble drive support structure 39 and the right piece 46 is attached to the lower right chain board 61. The left and right plates 41, 42 at the ends of the rear beam 40 support the transverse drive shaft 47 drivingly coupled to the various crop gathering means.

The stringer bar 35 extends across the width of the row crop attachment and base frame and has the left lower side frame 11, center lower frame 12 and right lower side frame 13 welded along the forward edge of the stringer bar. The stringer bar has a generally rectangular shape and is made of two members having L-shaped configurations. The stringer bar is very stiff to torsional bending and provides between the lower frame members and the base member a substantially rigid piece to prevent twisting of the attachment along this portion of the frames. The stringer bar 35 extends from the extreme right of the lower right frame 13 across the attachment to the extreme left of the lower left frame 11. The wobble drive supporting structure 39 is positioned to the rear of the left end of the stringer bar.

The lower side and center frames are of a generally conventional structure having peripheral flanges for stiffness and center openings for discharge of debris and any crop material that may tend to accumulate. The lower frame members narrow forwardly in a triangular shape to form the diverging stalkways 17 and 18. At the tip ends of the lower frames are shoes 48, 49 and 50 for engaging the ground.

Upper Center and Side Frames

The left upper side frame 14 and the right upper side frame 16 have lower chain boards 60, 61 and upper chain boards 62, 63. The lower chain boards are intermediately attached to the base frame 10 and the lower side frames 11 and 13, respectively. Extending upwardly from the lower crop gathering means 24 and 28 are left and right side guide plates 64 and 65 and rear side panels 66 and 67. The upper left and right chain boards 62, 63 are mounted on the respective guide plates 64, 65, rear panels 66, 67 and struts 70, 71, respectively. The struts are attached to the plates 41 and 42. The upper side frames have fenders 74, 75, respectively mounted on the chain boards 62, 63 at the rear and the respective lower side frames 11, 13 in front. The fenders are preceded by the divider point members 76, 77, respectively.

The lower center frame 12 has two lower chain boards 80 and 81 of the upper center frame 15 mounted thereon. The guide plates 82, 83 of the upper frame extend vertically therefrom. The center upper chain boards 84, 85 are mounted thereon. The fender 78 is spaced above the chain boards with the crop gathering means 23, 27 therebetween the rear panel and plate 90 is between the guide plates 82, 83 at the rear of the attachment. A divider point member 79 is on the front. The center guide plates have rear portions 82a, 83a converging in a rearward direction and have front portions 82b, 83b converging in a forward direction. The side guide plates 64, 65 have rear converging portions 64a, 61a and forward diverging portions. The two sets of guide plates form the stalkways 17 and 18 which converge rearwardly from the front ends of the frames to narrow portions of the stalkways commencing at the sickle or cutting means 30. Rearwardly of the cutting means the narrow portions of the stalkways converge to the discharge 31. The rear portions of the guide plates 64a, 82a and 65a, 83a are preferably parallel. The floor plates 88, 89 form trough bottoms to the narrow converging stalkways from the cutting means 30 to the discharge end. The lugs of the crop gathering means extend into the respective narrow portions of the stalkways in overlapping relation for feeding the cut crop through the discharge 31 to the feed rolls 32 of the forage harvester 33.

The rear panel 90 is of a triangular shape and is tilted at a substantial angle to the vertical plane. This positions the panel away from the discharge to provide a large discharge space 31 for distribution of the cut stalks. The upper and forward portion overlaps with the side guide plates 64, 65 and the rear and lower apex portion overlaps with the rear side panels 66 and 67 to define therewith the discharge space 31.

Crop Gathering Means

The crop gathering means are tilted downwardly to the horizontal in the forward direction. The lower side crop gathering means 24, 28 mounted on the lower chain boards 60 and 61 have chains which carry lugs 93 and 94 extending perpendicular to the respective gathering means into the stalkways.

The upper side crop gathering means 22 and 26 mounted on the chain boards 62 and 63, respectively, are tilted downwardly in a forward direction and extend from adjacent the discharge space 31 in diverging relation to one another. At the trough or rear portions of the respective stalkways the upper crop gathering means are generally parallel thereto.

The chains of the respective means are mounted on four sprockets and have lugs 95 and 96 extending perpendicular to the chains into the stalkways.

The center upper frame has upper and lower crop gathering means 23, 27 and 25, 29 mounted on chain boards 84, 85 and 80, 81, 87, respectively, and are of a generally triangular configuration. The rear parts of the crop gathering means diverge slightly from the upper side crop gathering means so that the lugs 97, 98 recess under the fender 78 and separate from the lugs 95, 96 of the respective upper side crop gathering means. The lugs 95, 96 recess behind the respective guide plates and fenders further rearward and generally on a line with the upper portion of the panel 90. Thus the upper part of the cut stalks are released from the upper crop gathering means before the lower side crop gathering means 24, 28.

The lower center crop gathering means 25, 29 are similar to the upper crop gathering means and have lugs 99, 100, respectively. The lower side crop gathering means 24, 28 extend to adjacent the rear of the attachment and the feed rolls 32 of a forage harvester 33. Stripper plates 132, 133 extend into the troughs to remove the crops from the lugs 95, 96. The crop gathering means 24, 28 terminate further to the rear than the other means for moving the cut stalk ends into the rolls.

A particular feature of this invention is that rear portions of the center upper crop gathering means are at a level lower than the adjacent portions of the upper side crop gathering means. This positions the upper center lugs 97, 98 below the upper side lugs 95, 96 in the areas of overlap. The areas of overlap precede the cutting means and extend rearward until the center lugs recess under the fender 78. This difference in height urges the stalks over the center for better distribution of the feed to the rolls and clearance of the stalks from the stalkways.

Drives for Crop Gathering Means

The crop gathering means are driven in a conventional manner from a transverse rotatable shaft 47 mounted in the base frame. Generally vertical shafts are connected by beveled gears 117, 118 on the transverse drive shaft 47 and to the rear drive sprockets of the side crop gathering means. The drive sprockets of the center crop gathering means are driven through beveled gears 125, 126 on the second transverse shaft 127 rotatably mounted in the base frame and connected by a chain and sprocket drive 128 to the shaft 47.

Cutter and Stringer Bar

The wobble drive 38 and the wobble drive support structure 39 on the side of the base frame is of a conventional type. The pivot arm 105 extends forwardly and is connected to the cutter bar 106. The cutter bar is pivotally connected at the opposite end to the arm 107 (FIG. 8). The arm 107, connected to the outer end of the bar, extends forwardly and is pivotally connected to the lower frame 13 forward of the stringer bar and cutter bar. Intermediate the bar preferably at the midpoint, a plate 109 is bolted to the stringer bar to back the cutter bar. The cutter bar extends along the top of the stringer bar 35.

The lower side and lower center frames are spaced at and welded to the stringer bar. Plates 110 and 111 (FIG. 6) are secured to the stringer bar 35 on the upper surface of the stringer bar. The plates extend forwardly and are attached to the lower frames. Notches corresponding to the space between the lower frames. Stationary side knives 114 and 115 are mounted on the respective plates 110, 111 and the respective lower frames and extend forwardly on opposite sides of the narrow stalkways for cutting stalk crops on approaching the sickle. The cutter bar has two triangular shaped cutting blades 125, 126 extending forwardly of the cutter bar 106 and stringer bar 35 in cutting relationship with the respective side knives. Hold down plates 127, 128, 129, 130 are mounted on the side knives and spaced therefrom by shims to provide narrow spaces for receiving the blades on reciprocation by the sickle bar. Cleaning blades 131, 132 are provided on the sides of the knife blades for maintaining the spaces clear. Wear plates 112, 113 (FIG. 6) are provided to protect the frame from excessive wear.

The mounting of the plates on the top surface of the stringer bar and the bolting of the side knives to these plates provides a rigid support structure for these side knives and prevent misalignment of the side knives and the reciprocating blades by distortion of the attachment frame.

Operation

As seen from FIG. 1 and 4 the upper center crop gathering chains 23, 27 are sloped at a lesser angle to the horizontal than the upper side crop carrying chains 22, 26 of the respective side frames. At the tip end of the frames, the upper crop gathering means 22, 23, 26, 27 may be at the same level. At the rear the center crop gathering means are below the side crop gathering means so that the lugs are at different levels and do not have to be in timed relation. The center fender is lower than the side fenders. The upper side crop gathering means and fenders urge the stalk crops over the center frame. The rear panel 90 is tilted to have the top edge at or below the upper side chains. This opens the discharge area for flow of crops from over the center frame resulting in an even and generally horizontal positioning of the stalk crops.

For harvesting corn the row crop attachment cuts two rows at a time. The rows of standing corn enter the stalkways 17 and 18. The corn stalks which are down or bent are picked up by the dividers 76, 77, 78 the forward portions of the crop gathering means. The lugs on the crop gathering means carry and converge the corn into the narrow portion of the stalkways. The stalks are cut by the stationary knives and reciprocating blades. The upper side crop gathering means 22, 26 being above the upper center crop gathering means force the cut stalks over the lower center fender 78. The upper lugs release the stalks while the lower side lugs 93, 94 are still operative. These lugs carry the lower cut ends of the tilted stalks to the feed rolls 32.

As the attachment is moving through the rows of crop the shoes 48, 49, 50 ride on the ground creating loads on the frame as variations in the ground occur. The stringer bar 35 stiffens the frame so that the cutting blades and side knives remain in cutting alignment or with minimum misalignment on the frame being subject to twisting loads.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, we claim:

1. A two row row crop attachment for a forage harvester of the type having upper and lower feed rolls for receiving crop stalks from said attachment and feeding the stalks rearwardly into the harvester, said row crop attachment comprising:
   a rear base frame;
   a center frame on said base frame and having a front and a rear end;
   left and right side frames on said base frame disposed respectively on opposite sides of the center and having front ends and rear ends, the side frames co-acting with the center frame to define left and right generally fore-and-aft extending stalkways for rows of crop stalks, the stalkways extending from the front of the center and side frame to the rear ends thereof;
   cutting means disposed in said stalkways adjacent the ground for cutting stalk type crops;
   fore-and-aft extending lower and upper side crop gathering means in the side frame disposed adjacent said stalkways;
   fore-and-aft extending lower center crop gathering means in the center frame disposed adjacent said stalkways and adapted to engage crop stalks in said stalkways in cooperation with said lower side crop gathering means; and
   fore-and-aft extending upper center crop gathering means in the center frame disposed adjacent said stalkways, the rear portions of the upper center crop gathering means being disposed below the adjacent portion of the upper side crop gathering means, the upper center crop gathering means being adapted to engage crop stalks in said stalkways in cooperation with the upper side crop gathering means, the engaged crop stalks being directed inwardly by the portion of the upper side crop gathering means which is disposed above the rear portion of the upper center crop gathering means for a smooth transition of crop from said stalkways to the feed rolls of a forage harvester.

2. A two row row crop attachment as set forth in claim 1 wherein said upper center crop gathering means and said respective upper side crop gathering means overlap in vertical projections from just forwardly of said cutting means to intermediate said rear portions of said stalkways.

3. A two row row crop attachment as set forth in claim 1 wherein the top of said center frame is below the top of said side frames.

4. A two row row crop attachment as set forth in claim 3 wherein said center frame has a forwardly sloped rearwardly facing triangular shaped panel having a forward upper edge below said side crop gathering means and said panel being tilted substantially from the vertical to have said discharge space receive and pass said stalks at a small angle to the horizontal.

5. A two row row crop attachment as set forth in claim 1 wherein said upper side crop gathering means and said upper center crop gathering means are at substantially the same level at the front.

* * * * *